United States Patent [19]

Paddon et al.

[11] 4,363,368
[45] Dec. 14, 1982

[54] MEDICAL PATIENT WEIGHING SCALE

[75] Inventors: Christopher M. Paddon, Denver, Colo.; Donald C. Wetzel, Berea, Ohio

[73] Assignee: Health Care Innovations, Inc., Medina, Ohio

[21] Appl. No.: 243,634

[22] Filed: Mar. 13, 1981

[51] Int. Cl.³ .......................................... G01G 19/44
[52] U.S. Cl. ..................................... 177/144; 177/50; 177/177; 177/211
[58] Field of Search ............... 177/50, 177, 199, 211, 177/225, 238, 239, 256-258, DIG. 3, 144, 132; 320/2

[56] References Cited

U.S. PATENT DOCUMENTS

| | | | |
|---|---|---|---|
| 3,217,818 | 11/1965 | Engelsher | 177/144 |
| 3,853,191 | 12/1974 | Yamagiwa | 177/210 R |
| 4,015,677 | 4/1977 | Silva | 177/DIG. 3 |
| 4,041,289 | 8/1977 | Brosh | 177/1 |
| 4,177,868 | 12/1979 | Sanders | 177/211 |

OTHER PUBLICATIONS

"Designs for Health Care Equipment, The Fourteenth Annual Armco Student Design Program", Published 1979, p. 22.
Acme Model 2500 Digital Bedside Scale, Acme Medical Scales, San Leandro, Calif.

Primary Examiner—Joseph W. Hartary
Attorney, Agent, or Firm—Pearne, Gordon, Sessions, McCoy & Granger

[57] ABSTRACT

A medical patient weighing scale is disclosed which comprises an elongated, flat, rigid pan, a plurality of thin, electronic bending beam load cells mounted in the pan, and a rigid, elongated, flat cover freely supported on the load cells. The cover is of sufficient size to support a patient in a supine position. The weighing scale is extremely thin, and may be conveniently mounted or stored when not in use. Accurate weight measurements are provided almost instantaneously on a digital display on the cover.

14 Claims, 6 Drawing Figures

U.S. Patent   Dec. 14, 1982   Sheet 1 of 3   4,363,368
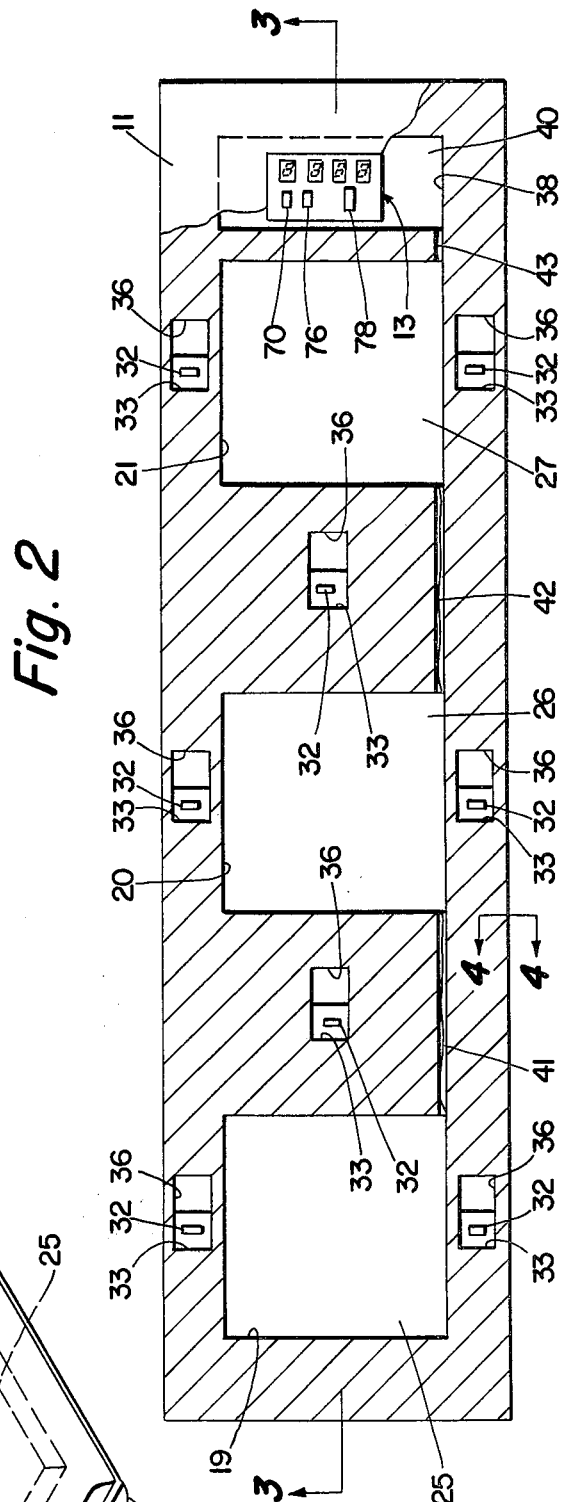
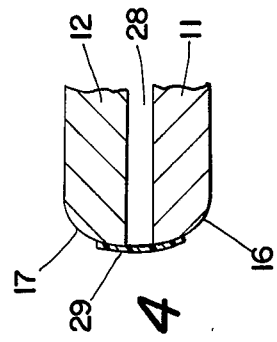
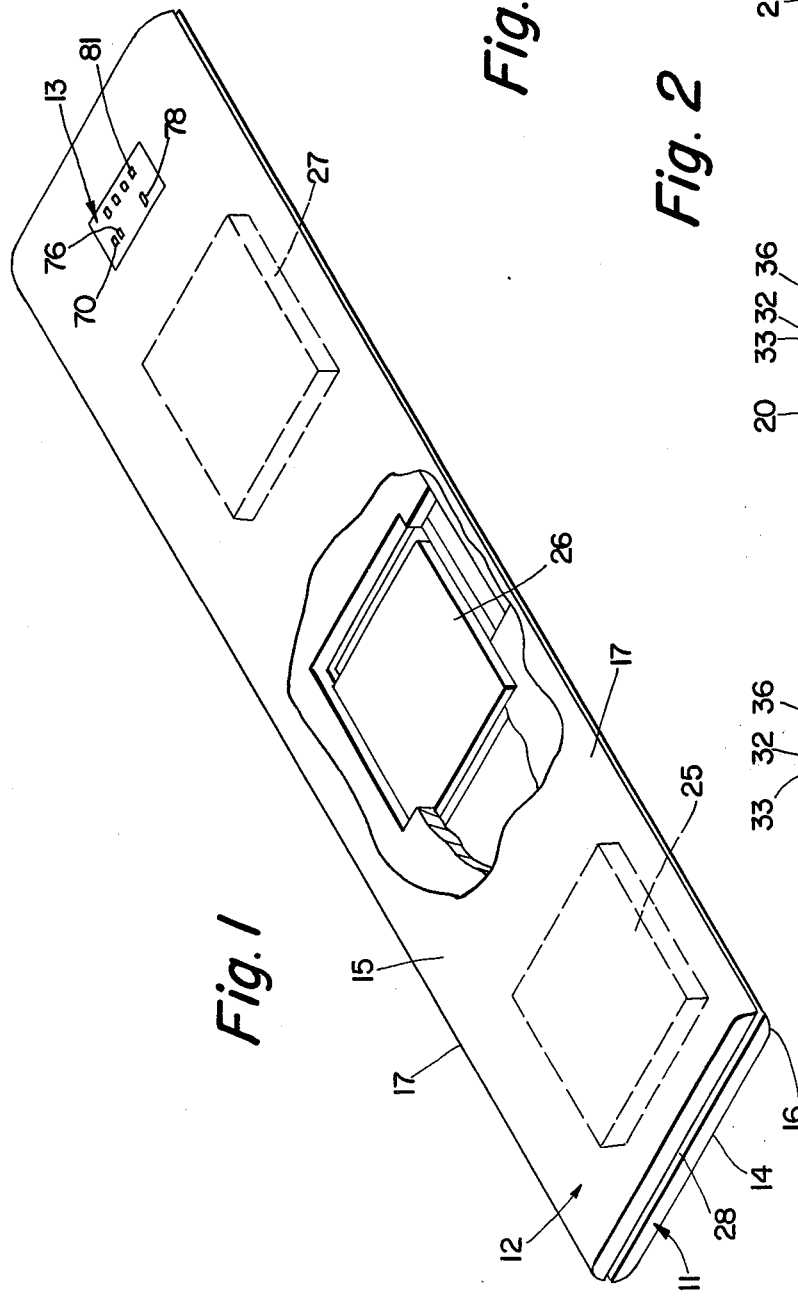

MEDICAL PATIENT WEIGHING SCALE

BACKGROUND OF THE INVENTION

1. Field of the Invention

This invention relates to hospital health care devices, and in particular to a scale for weighing patients lying in a supine or prone position.

2. Description of the Prior Art

In hospitals and other convalescent facilities, it is frequently necessary to obtain accurate weight measurements of patients. Obtaining an accurate weight measurement is relatively easy when the patient is ambulatory. The ambulatory patient can move to the conventional weighing scale and position himself on the scale while the measurement is being taken.

Obtaining an accurate weight measurement for nonambulatory patients is usually more difficult, and the need for an accurate patient weight measurement is often more important for patients whose medical condition means that they are not ambulatory. The need for such an accurate weight measurement often occurs in intensive care units, coronary care, surgical recovery, dialysis, intravenous therapy, shock, pediatrics, and fluid balance monitoring.

To provide weight measurement for nonambulatory patients, various types of patient scales have been available. All of these scales have utilized a patient lifting device to perform the weighing function. In some scales, the patient has been suspended in the device and the weight was determined by sensing the downward pull on the patient lift. In other scales, the patient is lifted on a large device which resembles a fork lift. While these scales have generally provided sufficiently accurate patient weight measurements, they have had several major drawbacks. A patient lifting scale is a relatively large piece of apparatus that requires significant storage space and is difficult to maneuver in a crowded patient room. Due to the size and complexity of the scale, it is not convenient for operation by a single attendant, and it often requires several attendants to transfer the patient to the device, to assure the safety of the patient, and to operate the scale. In addition, the nature of these patient scales has resulted in patient discomfort resulting from the transferring of the patient to and from the scale.

SUMMARY OF THE INVENTION

These and other problems of the prior art patient scales have been overcome by the present invention of a medical patient scale which provides accurate weight measurements and has other features of covenience and performance which have not been possible heretofore. The patient weighing scale of the present invention is extremely thin, and may be only approximtely two inches thick, so that the problems of storage space are eliminated. The thin, flat scale of the present invention may be stored vertically. A position-sensitive switch, such as a mercury switch, may be provided so that the scale is automatically turned off when placed in the vertical position for storage.

In addition, since the scale is so thin, a patient may be easily transferred onto the scale. It may be used on top of a regular hospital mattress, so that the patient may be conveniently weighed on the patient's bed without unduly disturbing the patient.

The scale of the present invention has substantial rigidity to allow accurate patient weight masurement in a thin convenient form. The interior of the scale is preferably provided with electronic bending beam load cells to accomplish an accurate electronic weight measurement.

The scale is relatively light so that it can be handled by a single attendant. It may weigh, for example, less than 20 pounds. In addition, it includes an internal power supply so that it is completely portable. The internal power supply is preferably rechargeable, and connections are provided for recharging the scale from ordinary 120 VAC. Added safety may be provided by a position-sensitive switch, such as a mercury switch, which disconnects the scale from the external 120 VAC when it is in the horizontal position during use.

The medical weighing scale of the present invention is highly accurate; for example, it may be capable of measuring and displaying a reading accurately to within 0.1 pound. The weight measurements produced by the scale of the present invention are presented in the form of an easy-to-read, highly visible, illuminated digital display presented on the top of the scale. The readout is almost instantaneous, and the scale may have the capability of measuring in pounds or kilograms.

These and other advantages are provided by the present invention of a medical patient weighing scale which comprises an elongated, flat, rigid pan capable of supporting the weight of a patient. A plurality of thin, electronic load cells are mounted in the pan. A rigid, elongated, flat cover is freely supported on the load cells. The cover is at least the same size as the pan and is of sufficient size to support a patient in a supine position. The cover is attached to the pan by extendable attachement means. Electronic summing means are mounted between the cover and the pan, and are connected to each of the load cells. The summing means receive signals from each of the load cells and produce a signal corresponding to the sum of the weight sensed by all of the load cells. Digital display means on the cover are connected to the summing means for displaying the weight corresponding to the signal from the summing means. Internal power supply means are provided for the load cells, the summing means, and the display means.

BRIEF DESCRIPTION OF THE DRAWINGS

FIG. 1 is a perspective view of the medical patient weighing scale of the present invention.

FIG. 2 is a top sectional view of the scale of FIG. 1.

FIG. 4 is a detailed sectional view taken along line 4—4 of FIG. 2 to a larger scale.

DESCRIPTION OF THE PREFERRED EMBODIMENT

Referring more particularly to the drawings, and initially to FIG. 1, there is shown the medical patient weighing scale of the present invention. The scale comprises a lower, elongated, flat, rigid pan 11 and an upper, rigid, elongated, flat cover 12. The pan 11 and cover 12 each have sufficient rigidity to support the weight of a patient, and are of sufficient size to support a patient in a supine or prone position. For example, the pan 11 and the cover 12 may be approximately 75 inches long and 24 inches wide. The pan 11 and the cover 12 may each be approximately one inch thick, and formed of a rigid, lightweight material. The preferred material is honeycomb aluminum, although other lightweight material may be used, such as other metallic alloys, fiberglass, other lightweight plastic materials, or even wood. The outer surfaces of the pan 11 and the cover 12 are coated with a plastic laminate material, such as Formica or other similar material, to provide a smooth outer surface which is rugged and can be easily cleaned and maintained. As shown in FIGS. 1 and 4, the side edges of the pan 11 and the cover 12 are curved to provide a smooth side surface to the scale. A display and control panel 13 is provided at one end of the cover 12. The panel 13 contains the digital display showing the weight measurement of the scale and control switches for operating and calibrating the scale.

Figure 3:
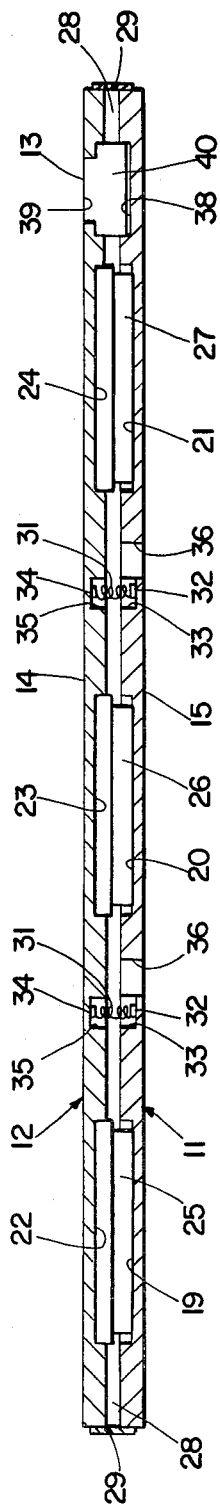
FIG. 3 is a side sectional view taken along line 3—3 of FIG. 2.

As shown in FIGS. 2 and 3, the pan 11 has three square recesses 19, 20, and 21, and the cover 12 has three corresponding square recesses 22, 23, and 24. Three load cells 25, 26 and 27 are mounted in the recesses 19-24. A small clearance 28 is provided between the pan 11 and the cover 12 to allow for compression of the load cells 25-27 during patient weighing and to prevent the pan 11 from touching the cover 12 during the weighing process. If the pan 11 touches the cover 12 during weighing, it will result in inaccurate weight measurement, as the weight is supported by the pan 11 directly from the cover 12 rather than through the load cells 25-27. The clearance 28 is covered around the periphery of the scale by a strip of adhesive plastic tape 29 or other flexible covering material (FIG. 4), which is attached to the sides and ends of the pan 11 and the cover 12.

The pan 11 and the cover 12 are attached to each other by extendable attachment means comprising a plurality of springs 31 each having one end attached to a tab 32 formed in a recess 33 in the pan 11, and having the other end attached to a corresponding tab 34 formed in a recess 35 in the cover 12. After the pan 11 and the cover 12 are positioned together, the springs 31 are installed through access holes 36 formed in the pan 11 adjacent to the ends of the recesses 33.

At one end of the pan 11, an additional recess 38 is formed, and a corresponding recess 39 is formed at one end of the cover 12. An electronics module 40 is mounted in the recesses 38 and 39. The module 40 has on one side the display and control panel 13 which extends from the module through an opening in the cover 12 so that the operator may have access to the controls and display. The electronics module 40 contains the control and adjustment switches used to control the operation of the scale, contains the power source for the scale in the form of a rechargeable battery, and contains the electronic circuitry used to drive the digital display readout on the panel 13, which can be seen from the upper surface of the cover 12. Instructions on the operation of the scale may also be placed adjacent to the panel 13 on top of the cover 12. Each of the load cells 25, 26, and 27 is connected to the electronics module 40 by wiring extending through grooves 41, 42, and 43 formed in the pan 11.

The patient weighing is accomplished by the three load cells 25, 26, and 27. Each of the load cells is essentially the same, and all will be described with reference to the load cell 26 shown in FIG. 5. The load cell 26 comprises four load sensing plates 46 located at each corner of the load cell. Each plate 46 is supported at the end of a lever arm 47 or 48. The lever arms 48 are shorter than the lever arms 47, and the ends of the lever arms 48 opposite the plates 46 are attached at approximately the middle of the lever arms 47. The ends of the longer lever arms 47 are attached to the cantilevered end of a bending beam 49. The other end of the bending beam 49 is attached to a supporting base 50. Thus, the load carried on the plates 46 is transmitted through the lever arms 47 and 48 to the outer cantilevered end of the bending beam 49. Strain gauge 52 is mounted on the bending beam 49, and are attached by appropraite wiring to a suitable preamplifier 53.

As weight is placed on the load cell 26, it is carried by the plates 46, which are pushed downwardly. This downward movement is transmitted by the lever arms 47 and 48 to the outer end of the bending beam 49. As the outer cantilevered end of the bending beam 49 is pushed downwardly, the other end of the beam supported by the base 50 remains in position, so that the beam bends and the top surface of the beam is subjected to strain. This strain is sensed by the gauge 52, and converted to an appropriate electrical signal which is enhanced by the preamplifier 53.

Figure 5:
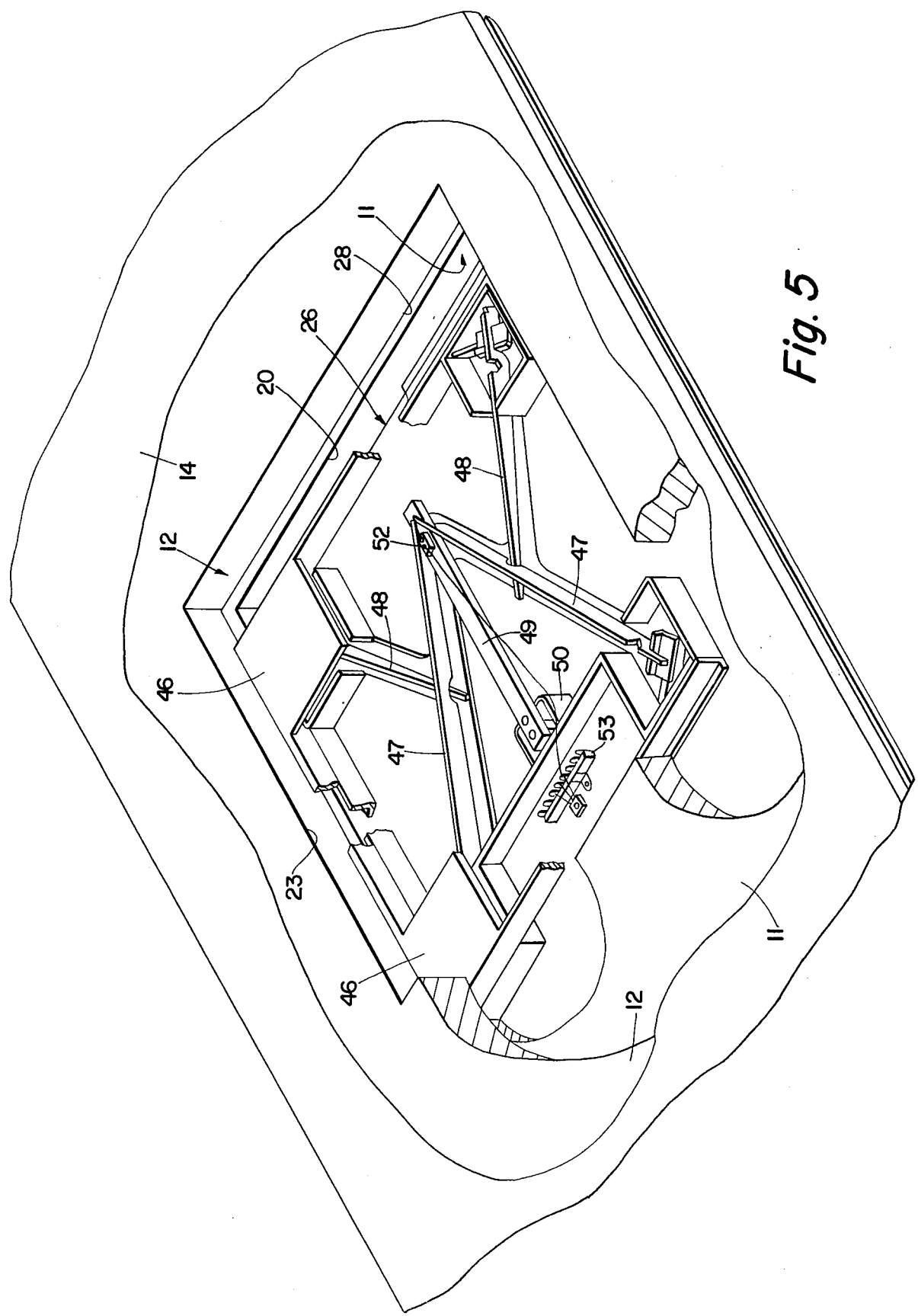
FIG. 5 is a detailed perspective view of one of the load cells of FIG. 1.

While other types of load cells are possible, bending beam load cells such as those shown in FIG. 5 are preferred. Each of the load cells 25-27 should be capable of accurately measuring weight to within 0.1 pound.

Figure 6:
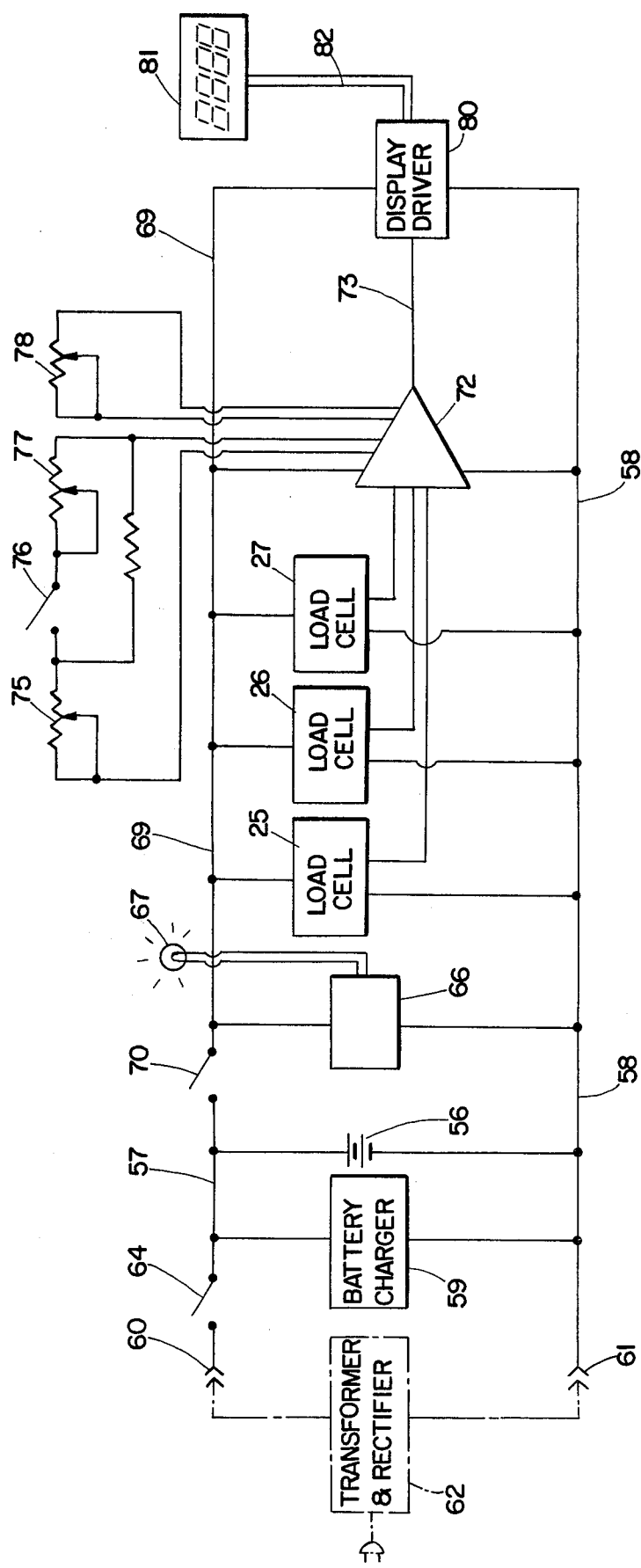
FIG. 6 is an electrical schematic showing the components of the medical patient weighing scale of the present invention.

The output of the load cells 25-27 is connected to electrical circuitry, so that the final weight measurement may be seen on the display and control panel 13, as indicated in FIG. 6. The circuitry shown in solid lines in FIG. 6 is contained in the electronics module 40, with the exception of the load cells 25-27. The electrical circuit uses a power supply means in the form of a battery 56. The battery 56 should be capable of providing 6 volts d.c. between lines 57 and 58. Preferably, the battery 56 is rechargeable, and a battery charger unit 59 is installed parallel to the battery 56 between the lines 57 and 58.

To recharge the battery 56, connections 60 and 61 are provided for a transformer and rectifier unit 62, which may have a suitable connection 63 for a conventional 120-volt a.c. power source. The transformer and rectifier unit 62 is provided in a unit separate from the weigh scale, and may be connected to the weigh scale by the connections 60 and 61 when battery recharging is desired. A position-sensitive switch 64 is provided in the line 57 between the battery charger 59 and the connection 60. The switch 64 is closed when the weigh scale is in the vertical position for storage, and is open when the weigh scale is in the horizontal position for use, so that the scale is not connected directly to a 120-volt power source when it is in operation. This feature allows increased safety in the use of the scale, and prevents any connection to high voltage during patient weighing. The position-sensitive switch 64 may be in the form of a mercury switch or other suitable type of switch.

A voltage-sensing unit 66 is also connected between the lines 57 and 58. The unit 66 is adapted to provide a signal when the voltage in the battery 56 falls beneath the predetermined level. When a low voltage situation is sensed by the unit 66, it illuminates a "low battery" signal lamp 67 which is preferably installed in the display and control panel 13 on the cover 12.

Power is provided to each of the load cells 25-27 between lines 69 and 58. A switch 70 is installed between the lines 57 and 69 of the power supply. The switch 70 is installed in the display and control panel 13 in the cover 12 and is manually operated to activate the weighing scale. The switch 70 may also be position-sensitive, such as in the form of a mercury switch, to allow power to reach the load cells 25-27 only when the scale is in a horizontal position, i.e., a position in which it is operable. The position-sensitive feature of the switch 70 would prevent the power supply from being inadvertently left on when the weighing scale is stored to prevent inadvertent discharge of the battery 56.

The output at each of the load cells 25-27 is connected to an amplifier 72. The amplifier 72 is also connected to the power supply by the lines 58 and 69. The amplifier 72 provides a summing means to add together electrical signals corresponding to the weights sensed by each of the load cells 25, 26 and 27, and to provide an output signal on a line 73 which corresponds to the sum of the weights read by the load cells.

The amplifier 72 may also perform additional functions. Preferably, a potentiometer 75 is connected to the amplifier 72 to calibrate the amplifier, so that the output signal on the line 73 corresponds to the weight reading in pounds. In addition, a switch 76 may be provided so that an additional calibration potentiometer 77 may be connected in series with the potentiometer 75. When the potentiometer 77 is properly adjusted, actuation of the switch 76 will convert the calibration of the amplifier 72 so that the output signal on the line 73 will be converted from a signal corresponding to the weight reading in pounds to a signal corresponding to the weight reading in kilograms. In addition, a potentiometer 78 is connected to the amplifier 72 and may be used to zero the output on the line 73. The operator may zero the output, using the potentiometer 78, for example, after placing bed clothes or other items upon the weighing scale which are not to be included in the weight measurement, in order to obtain an accurate weight reading. The potentiometer 78 and the "pounds-kilogram" switch 76 are both installed in the display and control panel 13 on the top of the cover 12 so that they may be readily operated. The calibration potentiometers 75 and 77 may also be installed there or at any other convenient place on the weighing scale device, since they will be adjusted less frequently.

The line 73 extending from the output of the amplifier 72 is connected to a display driver unit 80. The unit 80 is also connected to the power supply by the lines 58 and 69. The unit 80 is connected to a digital display 81 by a suitable number of lines 82. The display 81 is installed in the display and control panel 13 on the top of the cover 12 and may be readily viewed by the attendant operating the scale. Because each of the load cells 25-27 provides accurate and almost instantaneous weight measurements, a precise weight measurement is produced instantaneously on the display 81.

Various modifications and improvements to the weighing scale of the present invention are possible. For example, the scale may be mounted on a transporting cart so that it may be transported and stored while in the vertical position. Such a transporter may also contain the transformer and rectifier unit 62, so that the battery 56 may be automatically recharged when the scale is not in use.

While the invention has been shown and described with respect to a specific embodiment thereof, this is intended for the purpose of illustration rather than limitation, and other modifications and variations will be apparent to those skilled in the art all within the intended scope and spirit of the invention. Accordingly, this patent is not to be limited to the specific embodiment herein shown and described, nor in any other way which is inconsistent with the extent to which the progress in the art has been advanced by this invention.

What is claimed is:

1. A medical patient weighing scale comprising:
   an elongated, flat, rigid pan capable of supporting the weight of a patient, the pan being at least five feet long and adapted to be supported on a bed mattress;
   a plurality of thin, electronic load cells mounted in the pan, each load cell being spaced at least one foot apart along the length of the pan;
   a rigid, elongated flat cover freely supported on the load cells, the cover being at least the same size as the pan and being of sufficient size to support a patient in a supine position, the cover attached to the pan by extendable attachment means;
   electronic summing means mounted between the cover and the pan and connected to each of the load cells, the summing means receiving signals from each of the load cells and producing a signal corresponding to the sum of the weight sensed by all of the load cells;
   digital display means on the cover and connected to the summing means for displaying the weight corresponding to the signal from the summing means; and
   internal power supply means for the load cells, the summing means, and the display means.

2. A medical patient weighing scale as defined in claim 1, wherein the load cells comprise bending beam load cells.

3. A medical patient weighing scale as defined in claim 1, wherein the summing means includes calibration means for setting the signal produced by the summing means to zero, and adjustable controls for the calibration means are provided on the cover.

4. A medical patient weighing scale as defined in claim 1, wherein the summing means includes means for converting the signals corresponding to weight readings in pounds to signals corresponding to weight readings in kilograms, and the scale also comprises selection means on the cover to select between a desired output in pounds and kilograms.

5. A medical patient weighing scale as defined in claim 1, wherein the extendable attachment means comprise a plurality of springs each having one end attached to the pan and the other end attached to the cover.

6. A medical patient weighing scale as defined in claim 1, comprising in addition a switch connected to the power supply and which is sensitive to the orientation of the scale to disconnect the power supply from the other components when the scale is in a vertical position.

7. A medical patient weighing scale as defined in claim 1, wherein the internal power supply means comprises a battery contained between the pan and the cover.

8. A medical patient weighing scale as defined in claim 7, wherein the battery is rechargeable and the scale includes means for connecting the battery to a power source.

9. A medical patient weighing scale as defined in claim 8, comprising in addition a switch associated with the connecting means which is sensitive to the orientation of the scale to disconnect the scale from the power source when the scale is in the horizontal position.

10. A medical patient weighing scale as defined in claim 7, comprising in addition means for sensing low power from the battery and producing a low battery signal, and indicator means connected to the sensing means for providing a low battery indication on the cover 11. A medical patient weighing scale as defined in claim 1, wherein the pan and the cover are each formed of a honeycomb metallic structure.

12. A medical patient weighing scale as defined in claim 11, wherein the pan and the cover are formed of aluminum.

13. A medical patient weighing scale comprising:
an elongated, flat, rigid pan capable of supporting the weight of a patient, the pan formed of honeycomb aluminum;
a plurality of thin, electronic bending beam load cells mounted in the pan, each of the load cells having a strain gauge producing a signal corresponding to the weight reading of the load cells in pounds;
a rigid, elongated, flat cover freely supported on the load cells, the cover being at least the same size as the pan and being of sufficient size to support a patient in a supine or prone position, the cover attached to the pan by extendable springs;
electronic summing means mounted between the cover and pan and connected to each of the load cells, the summing means receiving the signals from each of the load cells and producing a signal corresponding to the sum of the weight sensed by the load cells in pounds, the summing means also including means to convert the signals corresponding to the weight readings in pounds to signals corresponding to weight readings in kilograms, the summing means also including calibration means for setting the signal produced by the summing means to zero;
digital display means on the cover and connected to the summing means for displaying the weight corresponding to the signal from the summing means;
selection means on the cover to select between the desired output in pounds and kilograms;
adjustable controls for the calibration means on the cover;
a rechargeable battery providing internal power supply means for the load cells, the summing means and the display means;
means for sensing low power from the battery and producing a low battery signal;
signal means on the cover connected to the low power sensing means;
means for connecting the battery to an external power source; and
a switch associated with the connecting means which is sensitive to the orientation of the scale to disconnect the scale from the external power source when the scale is in a horizontal position.

14. A medical patient weighing scale comprising:
an elongated, flat, rigid pan capable of supporting the weight of a patient;
a plurality of thin, electronic load cells mounted in the pan;
a rigid, elongated, flat cover freely supported on the load cells, the cover being at least the same size as the pan and being of sufficient size to support a patient in a supine position, the cover attached to the pan by extendable attachment means;
electronic summing means mounted between the cover and the pan and each connected to each of the load cells, the summing means receiving signals from each of the load cells and producing a signal corresponding to the sum of the weight sensed by all of the load cells;
digital display means on the cover and connected to the summing means for displaying the weight corresponding to the signal from the summing means;
rechargeable battery means contained between the pan and the cover for supplying power to the load cells, the summing means, and the display means;
means for connecting the battery means to a power source; and
a switch associated with the connecting means which is sensitive to the orientation of the scale to disconnect the scale from the power source when the scale is in the horizontal position.

* * * * *